United States Patent
Isley

(10) Patent No.: US 6,684,923 B1
(45) Date of Patent: Feb. 3, 2004

(54) FEED ROLLS FOR TREE HANDLING EQUIPMENT

(75) Inventor: Reggald E. Isley, Grande Prairie (CA)

(73) Assignee: Risley Enterprises Ltd., Grand Prairie (CA)

(*) Notice: Subject to any disclaimer, the term of this patent is extended or adjusted under 35 U.S.C. 154(b) by 0 days.

(21) Appl. No.: 10/345,212

(22) Filed: Jan. 16, 2003

(51) Int. Cl.⁷ .................................. B27B 31/00
(52) U.S. Cl. ..................... 144/248.7; 144/24.13; 144/248.3; 144/248.7; 198/780; 492/30; 492/32
(58) Field of Search ............. 144/242.1, 246.1, 144/248.3, 248.7, 24.13, 248.5; 198/618, 624, 780; 492/30, 32, 33, 36

(56) References Cited

U.S. PATENT DOCUMENTS 2,588,121 A * 3/1952 Johnston .............. 144/248.7 X
3,821,076 A * 6/1974 Stenberg et al. .......... 492/32 X

* cited by examiner

Primary Examiner—W. Donald Bray
(74) Attorney, Agent, or Firm—Oyen Wiggs Green & Mutala

(57) ABSTRACT

A feed roll for tree handling has a number of resiliently mounted strips which substantially cover its outer face. The strips have leading and trailing edges shaped to interdigitate with one another. A layer of resilient material is located between the strips and a drum. The resilient material has a hardness of 80 or less on the Shore scale.

26 Claims, 6 Drawing Sheets

FEED ROLLS FOR TREE HANDLING EQUIPMENT

TECHNICAL FIELD

This invention relates to rolls for feeding logs through tree handling equipment such as delimbers, tree processors and the like.

BACKGROUND

Some tree delimbers include a pair of curved knives that can be brought into contact with the outer surface of a log. The log is pulled past the knives which shear off any limbs projecting from the log. In typical tree delimbers the log is moved by compressing it between a pair of counter-rotating feed rollers. The feed rollers grip the log and move it along. An example of a tree delimber which works in this general manner is the SIDEWINDER™ model delimbers available from Risley Manufacturing Ltd. of Grande Prairie, Alberta, Canada.

Some existing feed rollers are faced with spikes to enable them to better grip the outer surface of a log. These spikes can incise the outer layer of wood of the log which is undesirable.

Other commonly-used feed rollers comprise a rubber-coated cylinder having a chain mesh stretched over its outer surface. These feed rollers, while reducing damage to the log surface, suffer from relatively short service lives and can be undesirably expensive.

Commonly-owned U.S. Pat. No. 4,972,890 describes a type of feed roller which comprises a cylindrical drum having contour-edged bars bolted to its outer surface. The contour-edged bars are relatively widely spaced apart. These feed rollers have not been completely successful, because they can cause chipping of the outer surface of logs.

Despite the variety of feed rollers available for use in tree processing machinery there remains a need for feed rollers which improve on the performance and/or cost effectiveness of current feed rollers.

SUMMARY OF THE INVENTION

This invention provides feed rolls for tree handling. A feed roll provided by one aspect of the invention comprises: a substantially cylindrical drum having a longitudinal axis; a plurality of strips spaced apart around a circumference of the drum, the strips extending substantially parallel to the longitudinal axis, each strip having a leading edge and a trailing edge, each strip having projections on its leading and trailing edges, the projections on the leading edge of each strip interdigitating with projections on a trailing edge of an adjacent strip; and, a layer of resilient material between each of the strips and the drum.

Another aspect of the invention provides a feed roller for a tree handling machine, the feed roller comprising: first and second substantially circumferential rings longitudinally spaced apart from one another; a plurality of strips extending between the first and second rings, the strips each having a first end extending under an edge of the first ring and a second end extending under an end of the second ring, a leading edge and a trailing edge, the leading of each strip having longitudinally spaced apart projections interdigitating with projections on a trailing edge of an adjacent strip; and, a rotatable drum comprising a resilient surface that bears resiliently against inner faces of the strips.

Further features and aspects of the invention are described below.

BRIEF DESCRIPTION OF DRAWINGS

In Figures which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention relates to feed rolls for feeding logs. Such feed rolls may be used in various applications. Feed rolls may be used, for example, in roll-stroke delimbers.

Figure 1:
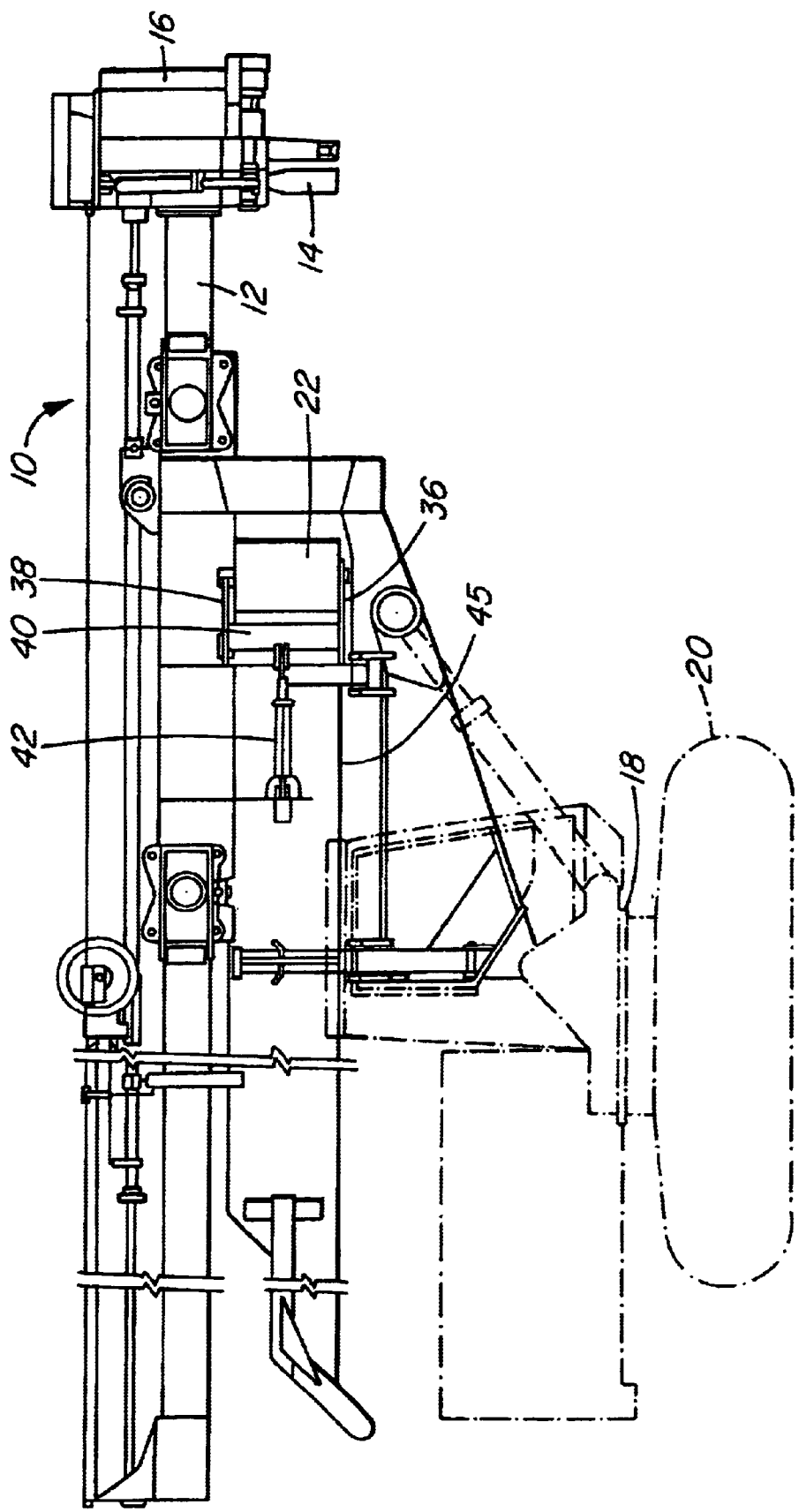
FIG. 1 is a side elevation of a prior art tree delimbing machine which includes a pair of feed rollers.

FIG. 1 illustrates a roll-stroke delimber 10 having a slidably displaceable boom 12 with a tree grapple 14 and saw 16 mounted at the free end of boom 12. Boom 12 is rotatably and pivotably supported above platform 18. Platform 18 is in turn mounted on a pair of treads 20 which may be driven in conventional fashion to propel delimber 10 relative to felled trees that are to be delimbed.

Roll-stroke delimber 10 may be actuated by its operator to tightly close grapple 14 about the butt of a felled tree and to retract boom 12 and, with it, the tree, toward log feed roller mechanism 22. Once grapple 14 is released, log feed roller mechanism 22 grips the tree and feeds it backwardly through tree guide tube 45. The tree is delimbed as its branches strike the arms of grapple 14 or cutters (not shown) mounted at the forward end of tube 45. Once the tree has been delimbed, log feed roller mechanism 22 may be actuated to propel the delimbed tree forwardly through tree guide tube 45. Saw 16 may then be actuated at selected intervals to buck the delimbed tree into desired lengths.

Figure 2:
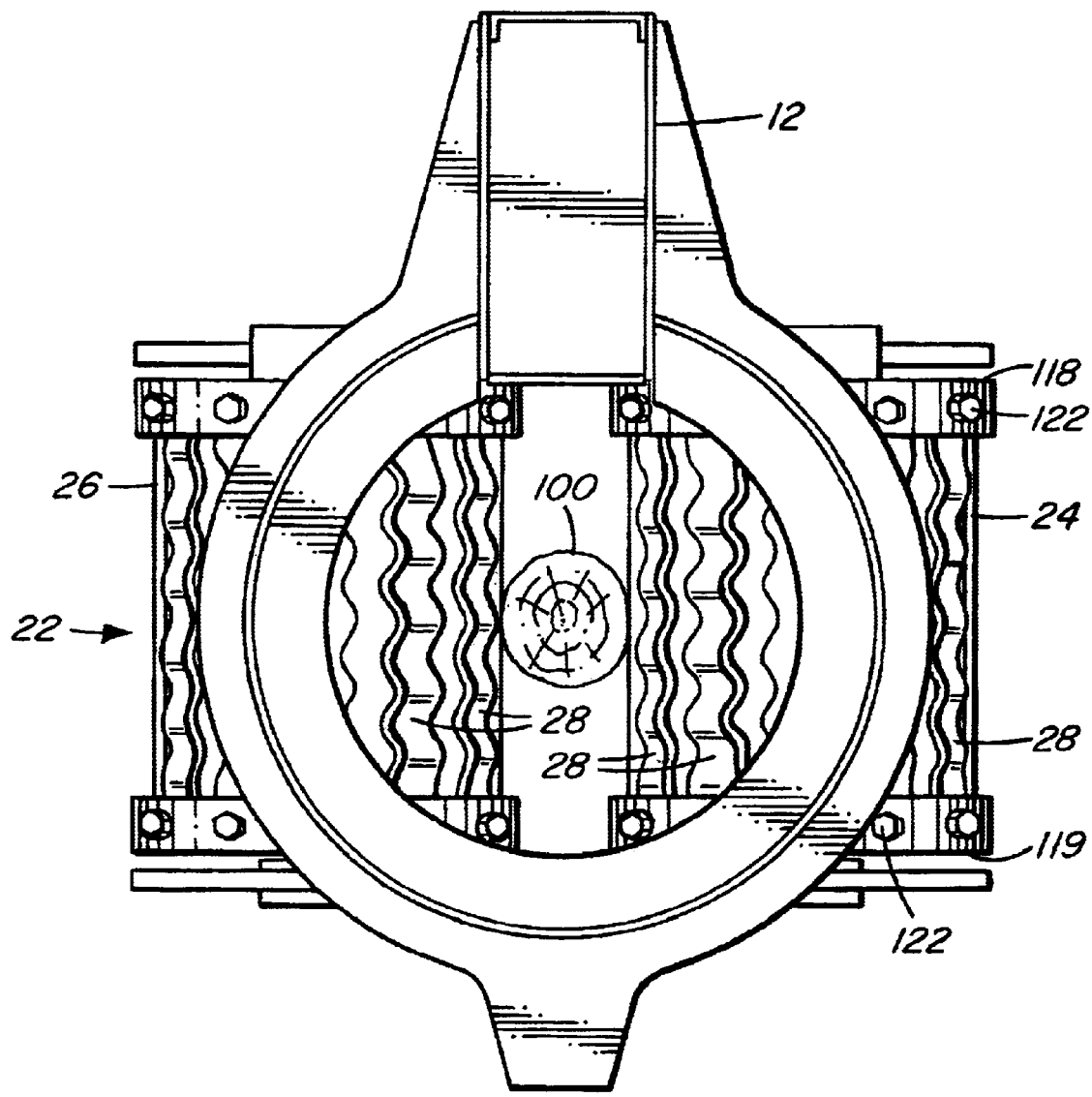
FIG. 2 is an enlarged end view of the feed roller portion of the machine of FIG. 1 equipped with feed rolls according to this invention.
Figure 3:
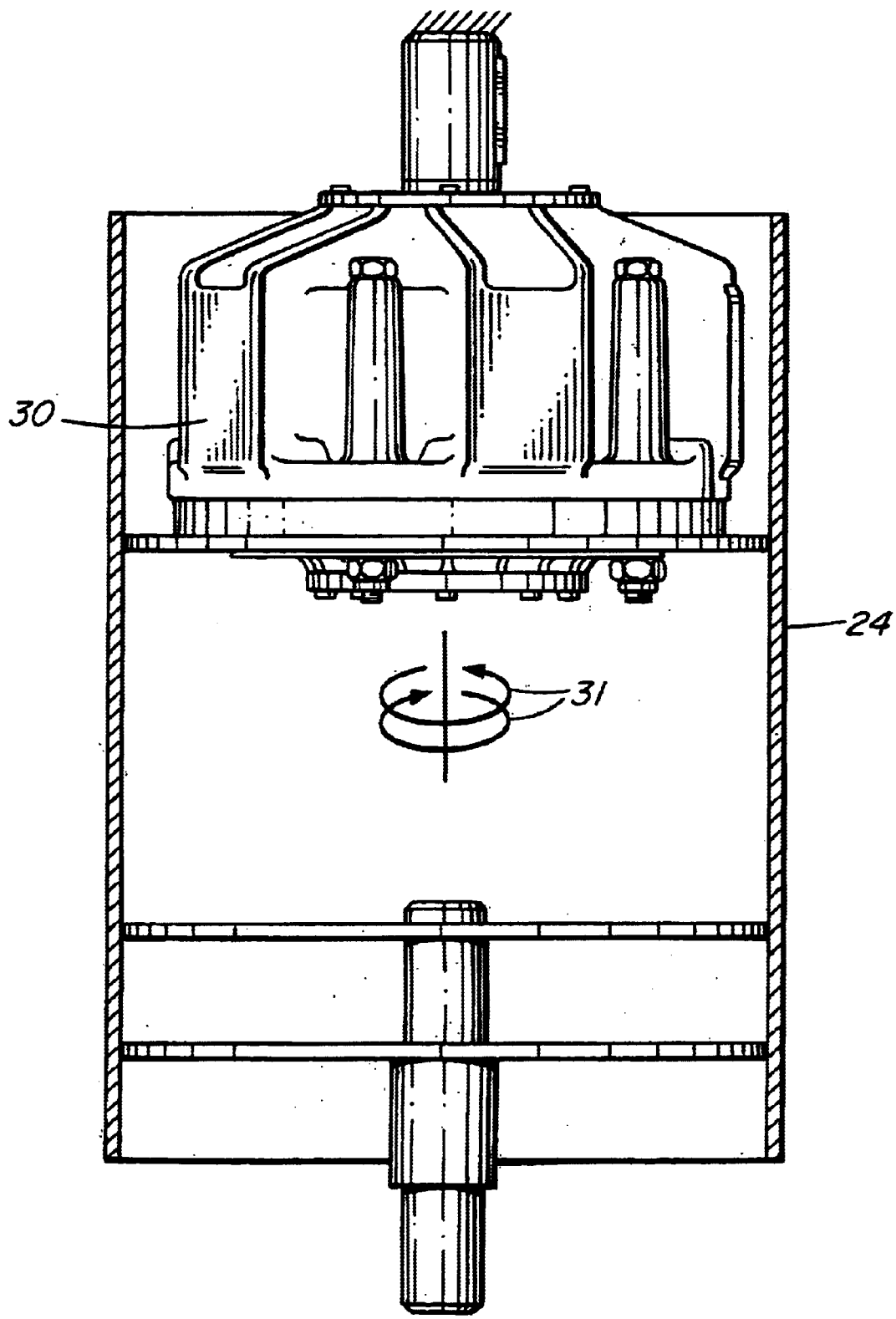
FIG. 3 is a cross-section through a feed roller.

Log feed roller mechanism 22 (FIG. 2) comprises a pair of drive rolls 24, 26 mounted parallel to one another (i.e. the longitudinal axes of rolls 24, 26 are parallel to one another and remain generally parallel to one another throughout the operation of delimber 10). A "drive means", such as a hydraulic motor 30 (FIG. 3) is connected to drivably counter-rotate rolls 24, 26 about their respective longitudinal axes. That is, motor 30 is capable of rotating roll 24 in either of the two directions illustrated by arrows 31 (FIG. 3). Similar provision is made for bidirectional rotation of roll 26. Other arrangements of driveshafts, motors, engines, etc. could be provided to turn one or both of feed rolls 24, 26. In the illustrated embodiment, a motor 30 is mounted inside each feed roll 24, 26.

Figure 4:
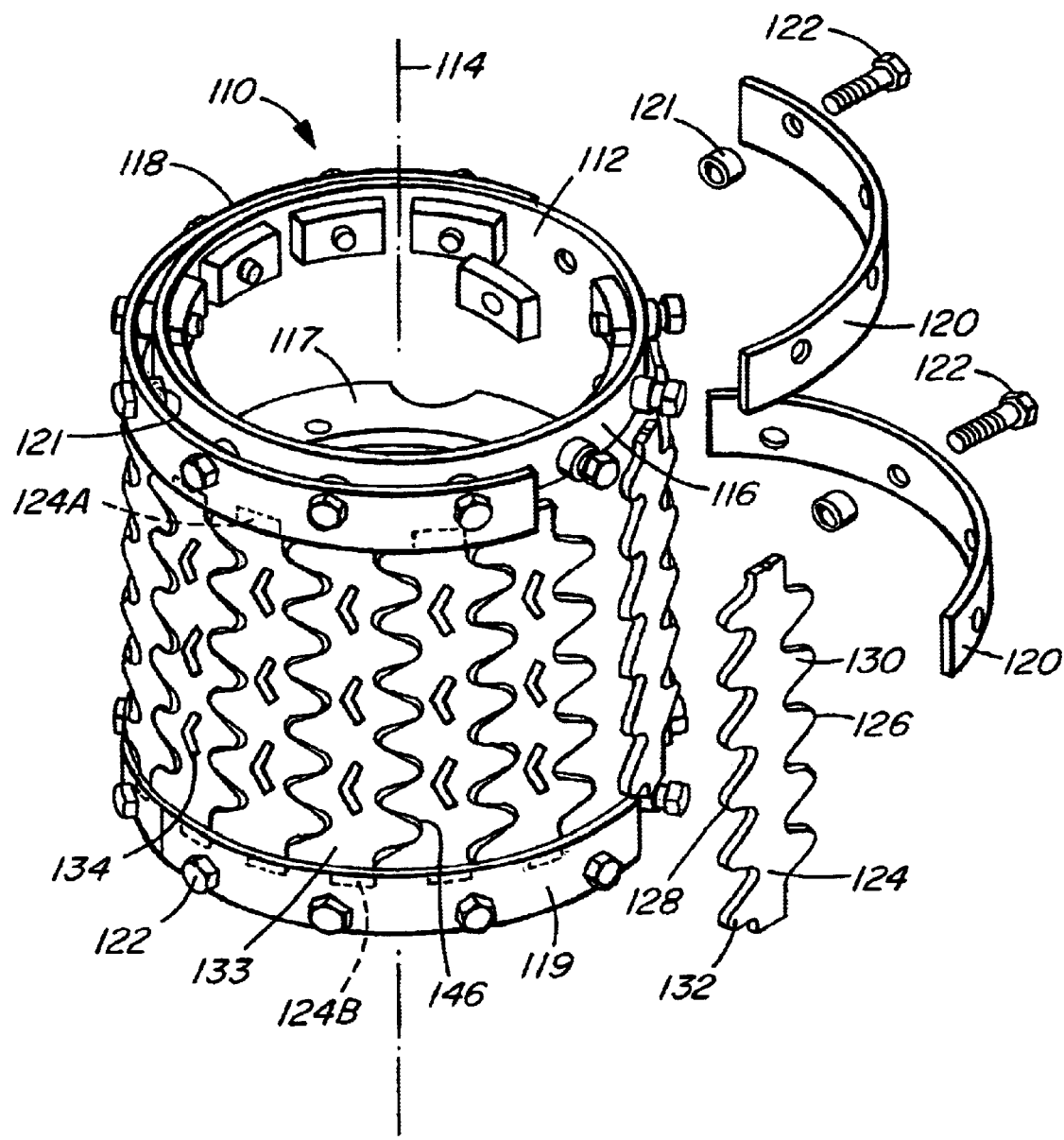
FIG. 4 is a perspective view of a feed roller according to one embodiment of the invention.

FIG. 4 shows a feed roll 110 according to one embodiment of this invention. Feed roller 110 comprises a cylindrical drum 112 having a longitudinal axis 114 and an outer surface 116. A flange 117 inside drum 112 permits drum 112 to be mounted for rotation on a tree handling machine such as, for example, a tree delimber. First and second rings 118 and 119 extend circumferentially around drum 112 at longitudinally spaced-apart locations. Each of rings 118 and 119 is spaced apart from outer surface 116 by spacers 121.

In the illustrated embodiment, rings 118 and 119 each comprise a plurality of arc-shaped sectors 120 which can be independently dismounted from drum 112. Sectors 120 are held in place by bolts 122 or other suitable fasteners.

A plurality of longitudinally extending strips 124 substantially cover the face of feed roller 110. Each strip 124 has a first end 124A engaged under first ring 118 and a second end 124B engaged under second ring 119. Strips 124 have leading edges 126 and trailing edges 128. Leading edges 126 are shaped to have a plurality of longitudinally spaced-apart projections 130. Each trailing edge 128 has a shape which is complementary to leading edge 126 of the adjacent strip 124. Projections 130 on leading edges 126 interdigitate with complementary projections 132 on trailing edges 128.

Figure 5:
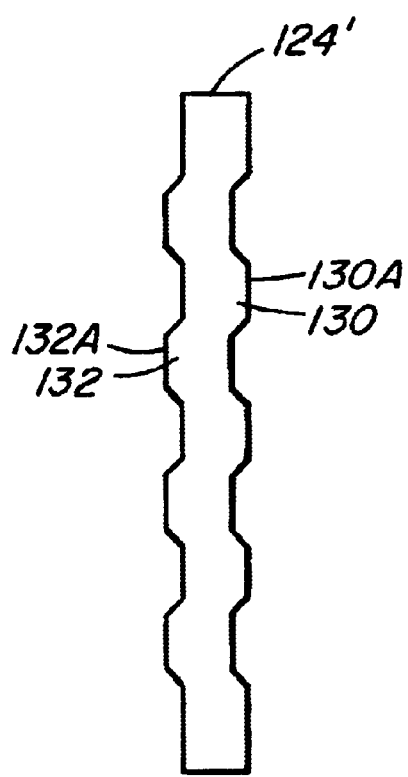
FIG. 5 illustrates a front elevation view of a strip according to an alternative embodiment of the invention.

In the illustrated embodiment, leading and trailing edges 126, 128 have wavy shapes such that projections 130 and 132 are rounded. Strips 124 may be called "contour-edged". FIG. 5 shows a strip 124' according to an alternative embodiment of the invention. Strip 124' has leading and trailing edges 126, 128, shaped to provide projections 130 and 132 that have flattened ends 130A, 132A.

Outer faces 133 of strips 124 are textured to enhance frictional contact with a log. In the embodiment of FIG. 4, V-bars 134 are affixed to outer faces 133.

Figure 6:
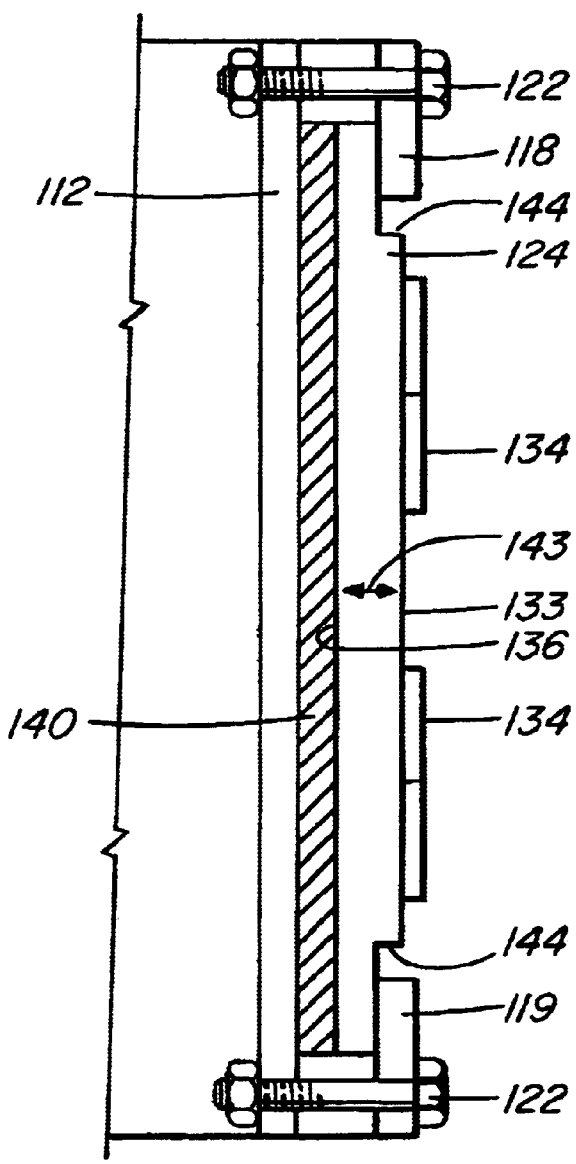
FIG. 6 is a transverse cross section through a portion of the feed roll of FIG. 4.

An inner face 136 (see FIG. 6) of each strip 124 is faced with a layer 140 of a resilient material. Layer 140 may, for example, comprise a layer of rubber, urethane or ceramic-impregnated urethane bonded to inner face 136. Layer 140 preferably has a hardness of 80 or less on the Shore scale. In some embodiments, layer 140 has a hardness in the range of 25 to 45 on the Shore scale. In some embodiments, layer 140 has a harness in the range of 25 to 35 on the Shore scale. In some embodiments, layer 140 has a thickness in the range of about 1/2 inches to about 3 inches.

Figure 7:
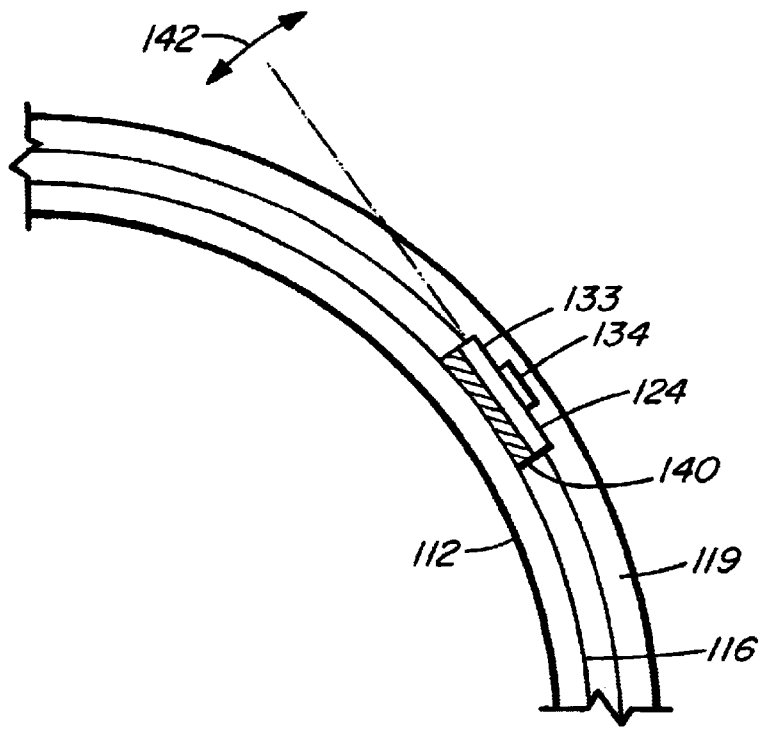
FIG. 7 is a longitudinal cross section through a portion of the feed roll of FIG. 4.

The construction of feed roller 110 permits strips 124 to rock slightly from side to side, as indicated by arrows 142 (FIG. 7), under the forces encountered when feed roller 110 bears against a log.

Strips 124 are preferably fabricated of a material which, if bent slightly, will spring back to its original shape. In one embodiment, strips 124 are fabricated from QT-100 steel (as defined by CSA standard 640.21/M). The resilience of strips 124 and the ability of layer 140 to yield under pressure permits strips 124 to flex inwardly and outwardly, as indicated by arrows 143 (FIG. 6), under the forces encountered when feed roller 110 bears against a log.

Strips 124 are captured by rings 118 and 119, but are free to float slightly. Longitudinal movement of strips 124 is limited by abutment surfaces on strips 124. In the illustrated embodiment of FIG. 6, the abutment surfaces comprise steps 144 on outer faces 133. Abutment surfaces could also be provided by other projections from strips 124, which can abut against part of the feed roll, such as rings 118 and 119, which are fixed to drum 112. Circumferential motion of strips 124 is limited by adjacent strips 124. Strips 124 may each be free to float circumferentially relative to drum 112 until they contact an adjacent strip 124.

Strips 124 may be dimensioned so that, when strips 124 are equally spaced-apart around drum 112, leading edge 126 of each strip 124 is separated from the trailing edge 128 of an adjacent strip 124 by a narrow gap 146 (FIG. 4). During use, gaps 146 tend to become packed with wood fibers and other fine debris. This further locks strips 124 together and provides some cushioning between adjacent strips 124.

Figure 8:
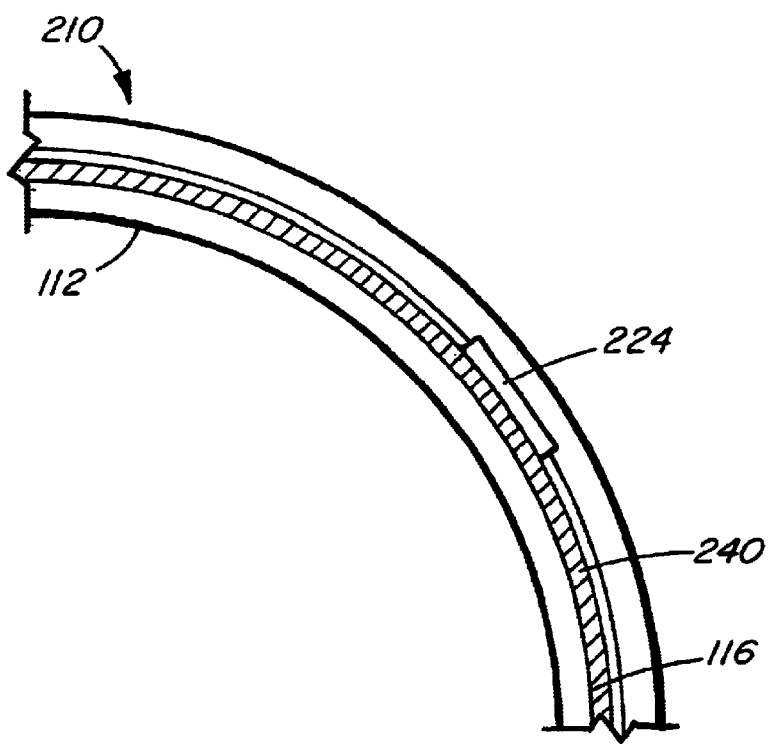
FIG. 8 is a transverse cross section through a portion of a feed roll according to an alternative embodiment of the invention.

FIG. 8 shows a section through a portion of a feed roller 210 according to an alternative embodiment of the invention. Feed roller 210 is similar to feed roller 110, except that a layer 240 of resilient material is affixed to surface 116 of drum 112. Strips 224 of the FIG. 8 embodiment may lack the layer 140 of resilient material of strips 124 of the FIG. 7 embodiment. Strips 224 are free to float slightly, as described above and can flex inwardly and outwardly and rock slightly under the forces exerted on them when feed roller 210 bears against a log. Layer 240 preferably has a hardness of 80 or less on the Shore scale. In some embodiments, layer 240 has a hardness in the range of 25 to 45 on the Shore scale. In some embodiments, layer 240 has a hardness in the range of 25 to 35 on the Shore scale.

As will be apparent to those skilled in the art in the light of the foregoing disclosure, many alterations and modifications are possible in the practice of this invention without departing from the spirit or scope thereof. For example:

one of rings 118 and 119 could be non-removably mounted to drum 112;

one or both of rings 118 and 119 could be replaced with other attachment means which permit strips 124 or 224 to float slightly;

feed rolls according to the invention may be used in any context in which it is desired to feed a tree longitudinally.

Accordingly, the scope of the invention is to be construed in accordance with the substance defined by the following claims.

What is claimed is:

1. A feed roll for tree handling, the feed roll comprising:
   a substantially cylindrical drum having a longitudinal axis;
   a plurality of strips spaced apart around a circumference of the drum, the strips extending substantially parallel to the longitudinal axis, each strip having a leading edge and a trailing edge, each strip having projections on its leading and trailing edges, the projections on the leading edge of each strip interdigitating with projections on a trailing edge of an adjacent strip; and,
   a layer of resilient material between each of the strips and the drum.

2. The feed roll of claim 1 wherein the resilient material has a hardness of less than 80 on the Shore scale.

3. The feed roll of claim 2 wherein the resilient material has a hardness in the range of 25 to 35 on the Shore scale.

4. The feed roll of claim 1 wherein the resilient material comprises at least one of: rubber, urethane and ceramic-impregnated urethane.

5. The feed roll of claim 2 wherein the resilient material comprises at least one of: rubber, urethane and ceramic-impregnated urethane.

6. The feed roll of claim 3 wherein the resilient material comprises at least one of: rubber, urethane and ceramic-impregnated urethane.

7. The feed roll of claim 1 wherein the layer of resilient material is bonded to the drum.

8. The feed roll of claim 1 wherein the layer of resilient material is bonded to the strips.

9. The feed roll of claim 1 wherein the leading and trailing edges of each strip have a wavy shape.

10. The feed roll of claim 1 wherein the strips comprise steel strips.

11. The feed roll of claim 10 wherein the strips comprise quenched tempered steel.

12. The feed roll of claim 1 comprising first and second longitudinally spaced apart rings extending circumferentially around and spaced apart from the drum, wherein a first end of each of the strips is engaged between the first ring and drum and a second end of each of the strips is engaged between the second ring and the drum.

13. The feed roll of claim 12 wherein outer surfaces of each of the strips comprise first and second abutment surfaces which limit longitudinal movement of the strips by abutting respectively against the first and second rings.

14. The feed roll of claim 12 wherein a shape of the leading edge of each strip is complementary to a shape of the trailing edge of the strip.

15. The feed roll of claim 14 wherein outer faces of the strips comprise textured surfaces.

16. A feed roll for tree handling, the feed roll comprising:
 a substantially cylindrical drum having a longitudinal axis;
 a plurality of steel strips spaced apart around a circumference of the drum, the strips extending substantially parallel to the longitudinal axis, each steel strip having a leading edge and a trailing edge, each steel strip having a leading edge shaped to provide projections, and a trailing edge having a shape complimentary to the shape of the leading edge, the projections on the leading edge of each steel strip interdigitating with projections on a trailing edge of an adjacent steel strip; and,
 a layer of resilient material having a hardness of less than 80 on the Shore scale located between each of the steel strips and the drum.

17. The feed roll of claim 16 wherein outer surfaces of each of the strips comprise abutment surfaces which limit longitudinal movement of the strips by abutting against parts fixed to the drum.

18. The feed roll of claim 16 wherein the resilient material has a hardness in the range of 25 to 35 on the Shore scale.

19. The feed roll of claim 16 wherein the layer of resilient material is bonded to the drum.

20. The feed roll of claim 16 wherein the layer of resilient material is bonded to the strips.

21. The feed roll of claim 18 wherein the layer of resilient material is bonded to the drum.

22. The feed roll of claim 18 wherein the layer of resilient material is bonded to the strips.

23. A feed roll for a tree handling machine, the feed roll comprising:
 first and second substantially circumferential rings longitudinally spaced apart from one another;
 a plurality of strips extending between the first and second rings, the strips each having a first end extending under an edge of the first ring and a second end extending under an end of the second ring, a leading edge and a trailing edge, the leading of each strip having longitudinally spaced apart projections interdigitating with projections on a trailing edge of an adjacent strip; and,
 a rotatable drum comprising a resilient surface that bears resiliently against inner faces of the strips.

24. The feed roll of claim 23 wherein the resilient surface has a hardness of less than 80 on the Shore scale.

25. A replacement tree gripping member for a feed roll for tree handling, the tree gripping member comprising:
 a strip of metal having a textured outer face,
 an inner face bearing a layer of a resilient material having a hardness of less than 80 on the Shore scale,
 a wavy leading edge comprising a plurality of projections, and
 a wavy trailing edge comprising a plurality of projections complementary to the leading edge projections.

26. The replacement tree gripping member of claim 25 wherein the outer face comprises abutment surfaces adjacent to each of first and second ends of the member.

* * * * *